US009826599B2

(12) United States Patent
Banta

(10) Patent No.: US 9,826,599 B2
(45) Date of Patent: Nov. 21, 2017

(54) VOICE-CONTROLLED LIGHT SWITCHES

(71) Applicant: Amazon Technologies, Inc., Seattle, WA (US)

(72) Inventor: William Christopher Banta, Lafayette, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/980,392

(22) Filed: Dec. 28, 2015

(65) Prior Publication Data

US 2017/0188437 A1  Jun. 29, 2017

(51) Int. Cl.
H05B 33/08 (2006.01)
H05B 37/02 (2006.01)
G10L 15/22 (2006.01)
G10L 15/30 (2013.01)
H04R 1/40 (2006.01)
H04R 1/02 (2006.01)

(52) U.S. Cl.
CPC .......... H05B 37/0236 (2013.01); G10L 15/22 (2013.01); G10L 15/30 (2013.01); H04R 1/028 (2013.01); H04R 1/406 (2013.01); H05B 37/0272 (2013.01); *G10L 2015/223* (2013.01)

(58) Field of Classification Search
CPC .. H05B 37/0236; H05B 37/072; H04R 1/028; H04R 1/406
USPC ........................................................ 315/297
See application file for complete search history.

(56) References Cited

U.S. PATENT DOCUMENTS

| 4,090,032 | A  | * | 5/1978 | Schrader ................ H04R 3/005 |
| | | | | 381/108 |
| 7,418,392 | B1 | * | 8/2008 | Mozer ..................... G10L 15/26 |
| | | | | 315/307 |
| 2001/0000534 | A1 | | 4/2001 | Matulich et al. |
| 2003/0179894 | A1 | * | 9/2003 | Saltykov .............. H04R 25/402 |
| | | | | 381/313 |
| 2008/0218372 | A1 | | 9/2008 | Schoettle |
| 2011/0158452 | A1 | * | 6/2011 | Chen ...................... H04R 1/083 |
| | | | | 381/361 |
| 2012/0105740 | A1 | * | 5/2012 | Jannard .................... G02C 9/04 |
| | | | | 348/794 |
| 2012/0147594 | A1 | * | 6/2012 | Tait ......................... A45C 3/06 |
| | | | | 362/156 |

(Continued)

OTHER PUBLICATIONS

PCT Search Report and Written Opinion dated Apr. 7, 2017 for PCT Application No. PCT/US16/68758, 17 pages.

*Primary Examiner* — Douglas W Owens
*Assistant Examiner* — Syed M Kaiser
(74) *Attorney, Agent, or Firm* — Lee & Hayes, PLLC

(57) ABSTRACT

This disclosure describes, in part, voice-controlled light switches that act as voice-controlled endpoints at which users may provide voice commands. These light switches may physically couple to a power source, as well as to one or more appliances. The light switches may include physical switches to selectively provide power to the appliances, either in a binary fashion (on or off) or along of spectrum of positions. In either instance, the appliances coupled to the light switches may include lights, electrical outlets, home appliances (e.g., dishwashers, washing machines, etc.), factory machinery, or any other device that receives electrical power.

20 Claims, 8 Drawing Sheets

(56) References Cited

U.S. PATENT DOCUMENTS

| | | | |
|---|---|---|---|
| 2012/0263478 A1* | 10/2012 | Jang | H04B 10/1141 |
| | | | 398/133 |
| 2013/0077808 A1* | 3/2013 | Bashkaran | H04R 25/556 |
| | | | 381/328 |
| 2015/0006176 A1 | 1/2015 | Pogue et al. | |
| 2015/0279387 A1 | 10/2015 | List | |
| 2016/0165116 A1* | 6/2016 | Robinson | G06F 3/167 |
| | | | 348/362 |

* cited by examiner

VOICE-CONTROLLED LIGHT SWITCHES

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
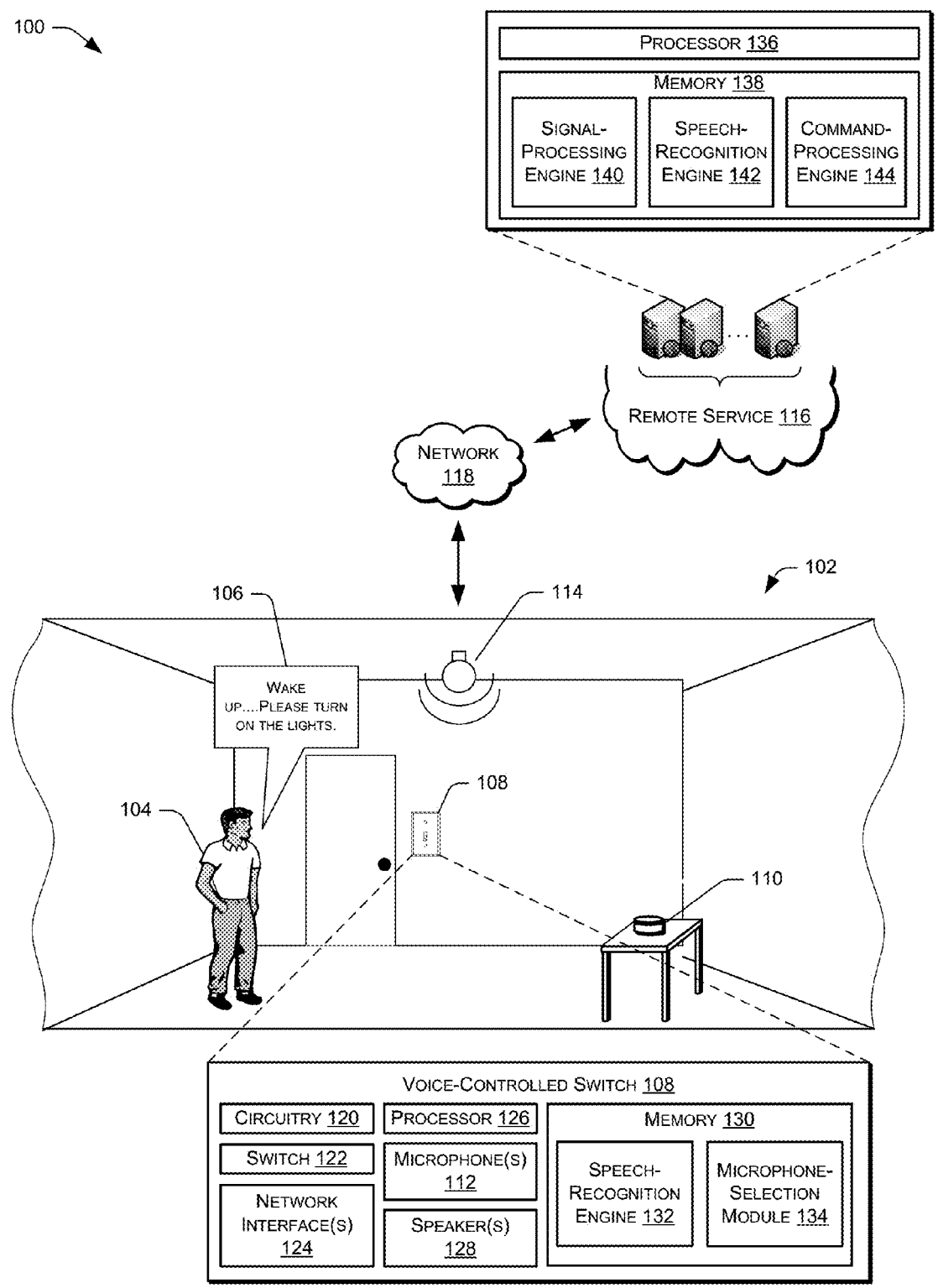
FIG. 1 shows an illustrative voice interaction computing architecture set in a home environment. The architecture includes at least one voice-controlled light switch and a voice-controlled device physically situated in the home, along with a user. In this example, the light switch includes one or more microphones for generating an audio signal that may include a command of the user, such as a command to turn on the lights in the illustrated room.

This disclosure describes, in part, voice-controlled light switches that act as voice-controlled endpoints at which users may provide voice commands. These light switches may physically couple to a power source, as well as to one or more power loads, such as appliances (e.g., lights, outlets, home appliances, etc.). The light switches may include physical switches to selectively provide power to the power loads, either in a binary fashion (on or off) or along of spectrum of positions. In either instance, the power loads coupled to the light switches may include lights, electrical outlets, home appliances (e.g., dishwashers, washing machines, smoke detectors, security alarms, automated door locks, automated window shades, thermostats, etc.), factory machinery, healthcare devices (e.g., insulin pumps, CPAP machines, etc.), cleaning devices (e.g., autonomous robotic vacuum cleaners, etc.), or any other device that receives electrical power.

In addition to these traditional light-switch components, the voice-controlled light switches described herein include one or more microphones for generating audio signals, from which one or more voice commands may be identified. For instance, a light switch may include a microphone on the physical switch, on the faceplate, and/or the like, with this microphone generating audio signals based on sound detected within the environment of the light switch. The light switch may perform speech recognition on the generated audio signal to identify a voice command, or the light switch may include a network interface for sending the audio signal to another device or to a remote service, which may perform the speech processing. The power source of the light switch may comprise a persistent power source, such as the primary alternating current (AC) power supply connected to a home or other building. As such, this power source may be used to power the microphones and other components of the light switch, in addition to the power load to which the light switch couples. Further, while the light switch may couple to the AC power supply, in other instances the light switch may couple to any other type of power source, such as batteries, capacitors, solar panels, or the like.

In some instances, the voice-controlled light switch includes a speech-recognition engine configured to identify a predefined utterance (e.g., a predefined sound or a predefined word or phrase) from a generated audio signal and, upon identifying this utterance, may begin providing generated audio signals to a remote service for performing speech recognition. Therefore, a user may determine when the audio signals are sent and when voice commands will be identified by speaking the predefined utterance (e.g., "wake up"). The voice commands may be for an array of activities, such as turning on the light in the user's environment, a request for information (e.g., "what is the temperature outside?"), a request to perform a task ("remind me to pick up Johnny at 4 pm"), or any other type of request.

In some instances, the voice-controlled light switches include multiple microphones, each configured to generate a respective audio signal. Together, these multiple audio signals may be processed to generate a processed audio signal, having a signal-to-noise (SNR) ratio that is greater than the SNR ratio of any singular one of the audio signals. For instance, the light switch, or a remote service, may utilize the multiple audio signals to generate a processed audio signal using beamforming techniques, noise-cancellation techniques, or the like. The voice-controlled light switch, the remote service, or another device may then perform speech recognition on the processed audio signal having the increased SNR, thus increasing accuracy and efficacy of the speech recognition.

In some examples, the voice-controlled light switch includes at least a first microphone on a switch of the light switch. That is, the first microphone may reside on the physical control used to cause the power load coupled to the light switch to couple to the power source and, hence, receive power, and may be used to electrically decouple the power load from the power source such that the power load does not receive power from the power source. The voice-controlled light switch may comprise a toggle light switch, a rocker light switch, a sliding-dimmer light switch, a rotatable-knob light switch, or any other type of switch. In addition, to the first microphone residing on the switch, the light switch may include one or more microphones located on the faceplate of the light switch or any other location on or adjacent to the light switch. For instance, when the light switch comprises a toggle light switch configured to reside in an up position and a down position, the light switch may include a second microphone on a top portion of the faceplate, as well as a third microphone located on a bottom portion of the faceplate. In some instances, the second and third microphones are substantially in-line with the first microphone in a horizontal direction. For example, when the switch—and the first microphone residing thereon—resides substantially in horizontal middle of the overall structure of the light switch, the second and third microphones may also reside in the horizontal middle.

In the above example, the light switch may include operating logic configured to determine when the switch resides in the up position and when the switch resides in the down position. In response to determining that the switch resides in the up position, the light switch may select for processing a first audio signal generated by the first microphone and a second audio signal generated by the second microphone (on the top portion of the faceplate). This processing may include performing beamforming or other processing locally on the signals or sending the signals to the remote service for performing beamforming or other processing techniques thereon. Given the locations of the first and second microphones, when the switch is in the up position these microphones may be substantially in-line with one another in the vertical direction. Further, given the common height of light switches on walls and average height ranges of users, these microphones may also be substantially vertically in-line with a mouth of a speaking user. Using audio signals generated from microphones in this configuration is particularly helpful when performing beamforming on these audio signals to generate a processed audio signal having a relatively high SNR. As such, selecting the first and second audio signals for processing when the switch resides in the up position may result in particularly accurate speech recognition. Stated otherwise, because the first and second microphones are in the same substantial horizontal plane (i.e., are substantially the same vertical height off of the floor), when the user speaks in the room towards the wall/light switch, the audio of the user may reach the first microphone and then the second microphone which is substantially vertically in-line with the first microphone. This configuration may result in effective beamforming or other signal processing.

Conversely, when the switch resides in the down position, the operating logic may select for processing the first audio signal (generated by the first microphone on the switch) and a third audio signal generated by the third microphone on the bottom portion of the faceplate. Again, given that these microphones are substantially in-line with one another in the vertical direction when the switch is in the down position (as well as substantially vertically in-line with a mouth of a speaking user), these audio signals represent excellent candidates for performing beamforming thereon to generate a processed audio signal having a relatively high SNR.

In addition, the voice-controlled light switch may comprise one or more additional microphones on the faceplate aligned horizontally with the second microphone and one or more additional microphones on the faceplate aligned horizontally with the third microphone. For instance, the light switch may include a fourth microphone to the left of the second microphone and a fifth microphone to the right of the second microphone. In these instances, when the switch is in the up position the operating logic of the light switch may determine whether to select one or more of the following pairs of audio signals: (1) the first audio signal and a fourth audio signal generated by the fourth microphone; (2) the first audio signal and the second audio signal, and/or (3) a fifth audio signal generated by the fifth microphone. In some instances, the operating logic may determine a location of an audio source in the environment (e.g., the speaking user) to determine which one or more pairs of audio signals to select for processing. For instance, the operating logic may attempt to determine which pair of these pairs of microphones is most in-line with the speaking user. In other instances, the operating logic may select a blend of these pairs.

For instance, the operating logic may define a first line based on the position of the fourth microphone and the position of the first microphone, a second line based on position of the second microphone and the position of the first microphone, and a third line based on the position of the fifth microphone and the first microphone. The operating logic may then determine which line points closet to the estimated direction of the user. In some instances, the operating logic utilizes time-difference-of-arrival (TDOA) techniques to estimate the location of the user within the environment.

While the above example describes a light switch that includes multiples microphones and that couples a power source to a power load, in other instances the techniques described herein may encompass an apparatus that does not couple a power source to a power load. Instead, the apparatus may simply comprise a physical switch (e.g., a rotatable knob) that includes multiple microphones that may be selected for processing based on a position of the switch.

While the examples that follow describe several example configurations of a voice-controlled light switch, other implementations may utilize any other number of microphones located at an array of positions. In addition, these voice-controlled light switches may include an array of other components, such as output devices (e.g., speakers, displays, etc.), different types of network interfaces (e.g., wired network interfaces, BLE interfaces, Zigbee interfaces, WiFi interfaces, etc.), and the like.

FIG. 1 shows an illustrative voice interaction computing architecture 100 set in a home environment 102 that includes a user 104, a voice-controlled light switch 108, and a user device 110. As illustrated, the user issues a voice command 106 ("Wake up . . . please turn on the lights.") In some instances, the voice-controlled light switch 108 may include one or more microphones 112 that may generate one or more audio signals for identifying the voice command and performing a corresponding action, such as turning on a light 114 within the environment 102.

In some instances, the voice-controlled light switch 108 may identity the predefined word or phrase ("wake up") and may thereafter begin streaming one or more audio signals to another device for processing, such as to a remote service 116 comprising one or more remote devices (or "computing resources"). These remote computing resources may form a portion of a network-accessible computing platform implemented as a computing infrastructure of processors, storage, software, data access, and so forth that is maintained and accessible via a network such as the Internet. The remote computing resources do not require end-user knowledge of the physical location and configuration of the system that delivers the services. Common expressions associated for these remote computing devices include "on-demand computing", "software as a service (SaaS)", "platform computing", "network-accessible platform", "cloud services", "data centers", and so forth. Further, while FIG. 1 illustrates the remote service as being accessible over a network, in other instances the remote service/device may comprise a local hub within an environment of the voice-controlled light switch 108.

The remote service 116 may perform processing on these audio signals (e.g., beamforming, acoustic echo cancelation, etc.) as well as speech recognition to identify one or more voice commands, such as the command 106 to turn on the light. After identifying the voice command, the remote service 116 may send an instruction to the voice-controlled light switch 108 or to another device (in the environment 102 or otherwise) to perform a corresponding action. In this example, the remote service 116 may send an instruction to the light switch 108 to turn on the light 114. In response to receiving this instruction, the voice-controlled light switch 108 may execute the instruction and turn on the light 114. That is, a switch internal to the light switch may cause circuitry of the light switch to provide power to the lights connected to the switch, without the toggle switch moving positions (as in the case of a user manually flipping the toggle switch). Instead, the internal switch or other functionality may couple or decouple one or wires together with one another to cause power to flow to the connected lights. Conversely, the internal switch may block or throttle current to effectively decouple these wires such that current is not provided to the connected lights or other power load.

In the example described above, the voice-controlled light switch 108 may communicate with the remote service 116 over one or more networks 118, which may comprise wired technologies (e.g., wires, USB, fiber optic cable, etc.), wireless technologies (e.g., WiFi, RF, cellular, satellite, Bluetooth, etc.), or other connection technologies. The network 118 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. In some instances, the voice-controlled light switch 108 may also communicate with user devices via short-range wireless communication protocols (e.g., Bluetooth, Zigbee, etc.), such as the user device 110. For instance, the voice-controlled light switch 108 may provide audio signals to the user device 110 or other user devices, which may in turn send the audio signals to the remote service 116 or may itself perform the processing (e.g., beamforming) and/or speech recognition. In still other instances, the voice-controlled light switch 108 may communicate with local user devices to send instructions to these devices. For instance, if the user 104 states a command to "turn on my kitchen television", the voice-controlled light switch 108 may send an instruction to do so to the kitchen television using the appropriate protocol used by the television.

As illustrated, the voice-controlled light switch 108 may include the microphones 112, circuitry 120 for coupling the light switch to a power source and to the light 114, a physical switch 122 (e.g., a toggle switch, a rocker switch, a slider, a knob, etc.), one or more network interfaces 124, a processor 126, one or more speakers 128, and memory 130. As illustrated, the memory 130 may store a speech-recognition engine 132 and a microphone-selection module 134. As described above, the speech-recognition engine 132 may function to perform speech recognition on audio signals generated by the microphones 112 to identify a predefined word or phrase, such as "wake up". After identifying this word or phrase, the light switch 108 may begin sending one or more of the audio signals to the remote service 116 using one of the network interfaces 124. Before doing so, however, the microphone-selection module 134 may determine which microphones and corresponding audio signals to select based on the current position of the switch and/or the current position of an audio source, such as a user speaking with the environment. In some instances, the voice-controlled light switch 108 may include a sensor to determine the position of the physical switch 122.

For instance, if the voice-controlled switch 108 is currently in an up position, then the microphone-selection module 134 may determine to send, to the remote service 116, an audio signal generated by a microphone on the switch and an audio signal generated by a microphone on a top portion of the faceplate. Further, if the faceplate includes multiple microphone the microphone-selection module 134 may select an audio signal corresponding to a microphone most in-line with the user 104 and the microphone on switch, relative to the other microphones on the top portion of the faceplate. To do so, the microphone-selection module 134 may first determine the position of the user 104 in the environment using TDOA techniques, using an image sensor to identify the user within the environment, or in any other manner.

Further, if the switch is currently in the down position, the microphone-selection module 134 may select an audio signal corresponding to a microphone on the bottom portion of the faceplate. Again, when the bottom portion includes multiple microphones, the module 134 may select the microphone most in-line with the position of the user 104 and the microphone on the switch.

As illustrated, the remote service 116 includes a processor 136 and memory 138, which have access to a signal-processing engine 140, a speech-recognition engine 142, and a command-processing engine 144. In some instances, as described below, the voice-controlled light switch 108 or other client devices within the environment 102 may upload audio signals to the remote service 116 for processing, given that the remote service 116 may have a computational capacity that far exceeds the computational capacity of the voice-controlled light switch 108. Therefore, upon receiving multiple audio signals from the voice-controlled light switch 108, as selected by the microphone-selection module 134, the signal-processing engine 140 may perform one or more relatively complex processing techniques on the signals to generate one or more processed audio signals. For instance, the signal-processing engine 140 may perform beamforming, acoustic-echo cancelation, background noise reduction, or other techniques to generate one or more processed audio signals having a higher SNR than the pre-processed audio signals. Furthermore, as discussed above and as illustrated in FIG. 8, the voice-controlled light switch 108 may additionally or alternatively include the signal-processing engine 140 for performing the beamforming, acoustic-echo cancelation, background noise reduction, or other techniques prior to uploading the processed audio signals to the remote service 116.

Thereafter, the speech-recognition engine 142 may perform speech-recognition on the processed audio signal(s) to identify one or more voice commands represented therein, such as the example voice command 106. Thereafter, the command-processing engine 132 may cause performance of one or more action in response to identifying the voice command. In the illustrated example, for instance, the command-processing engine 132 may issue an instruction to the voice-controlled light switch 108 to turn on the light 114.

Given the above, in some instances the voice-controlled light switch 108 transitions from an "asleep" state, in which the local speech-recognition engine 132 performs ASR to identify a predefined utterance, to an "awake" state, in which the voice-controlled light switch 108 provides audio signals to the remote service 116 for processing and performing ASR thereon. In other instances, meanwhile, the voice-controlled light switch 108 may include a selectable physical button or soft button that causes the voice-controlled light switch 108 to transition from the "asleep" state to the "awake" state in response to a user selecting the button.

Furthermore, regardless of whether the speech recognition occurs locally or remotely from the environment 102, the voice-controlled light switch 108 may receive vocal input from the user 104 and the voice-controlled light switch 108 and/or the remote service 116 may perform speech recognition to interpret a user's operational request or command. The requests may be for essentially any type of operation, such as turning on or off appliances, adjusting appliance settings, authentication, database inquires, requesting and consuming entertainment (e.g., gaming, finding and playing music, movies or other content, etc.), personal information management (e.g., calendaring, note taking, etc.), online shopping, financial transactions, and so forth.

Figure 2:
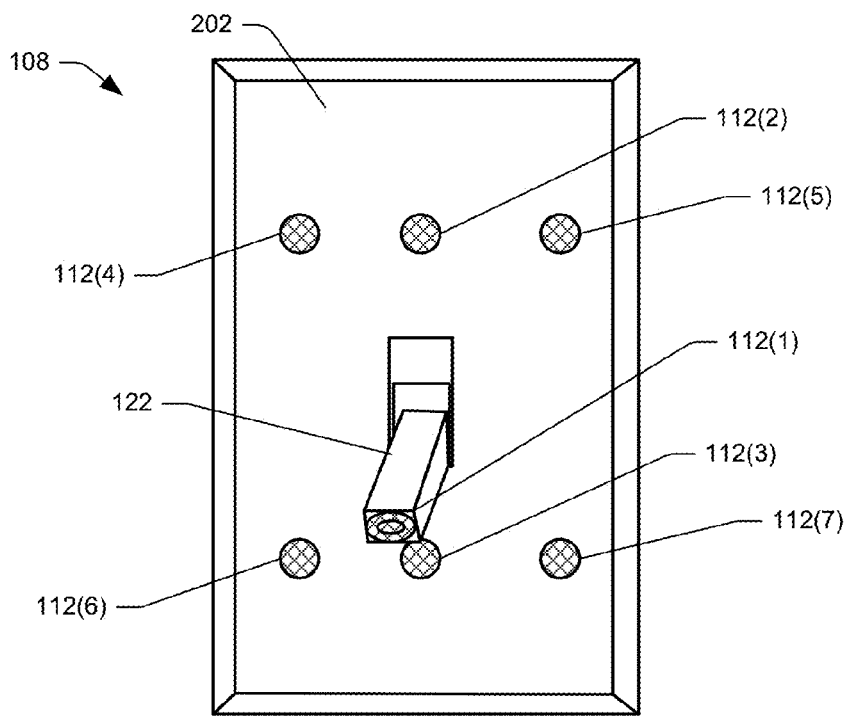
FIG. 2 illustrates an example voice-controlled light switch that includes a microphone on a distal end of a switch (or "toggle") of the light switch, and microphones on the faceplate of the light switch. In some instances, the light switch may include functionality to determine whether the switch in a first position (e.g., the up position) or a second position (e.g., the down position) and may select audio signals to process based on this position. For instance, the if the switch is in the first position, the light switch may select, for processing, the audio signals generated by the microphone on the switch and one or more of the microphones on the top section of the faceplate, which may allow for more accurate speech processing as described below.
Figure 2:
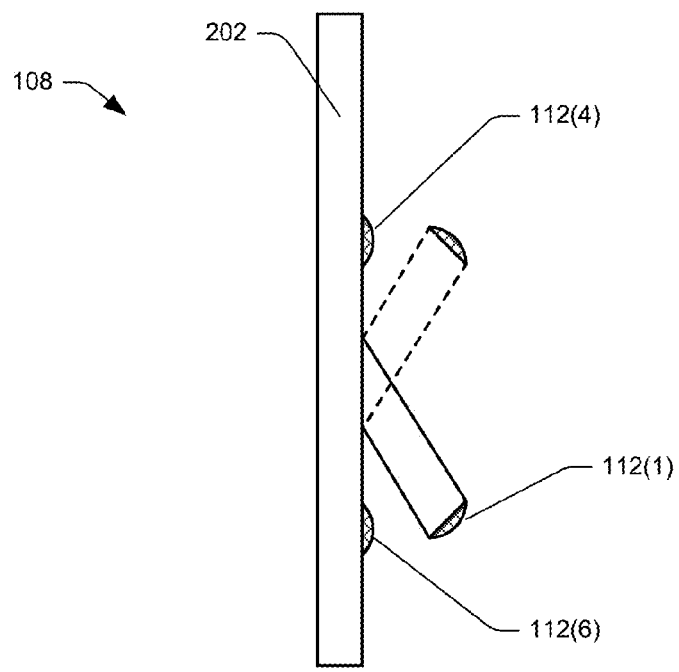

FIG. 2 illustrates an example configuration of the voice-controlled light switch 108. As illustrated, the voice-controlled light switch 108 includes a first microphone 112(1) on a distal end of the switch 122 (or "toggle") of the light switch 108. Because the microphone 112(1) resides on the end of the switch 122, the first microphone 112(1) may reside nearer the top of a faceplate 202 of the light switch 108 (when the switch 122 is in the up position) or nearer the bottom of the faceplate 202 (when the switch 122 is in the down position).

In addition, the voice-controlled light switch 108 may include a second microphone 112(2) located nearer the top edge of the faceplate 202, as well as a third microphone 112(3) located nearer the bottom edge of the faceplate 202. As such, the microphone 112(1) may be nearer the microphone 112(2) when the switch 122 is in the up position and may be nearer the microphone 112(3) when the switch 122 is in the down position. That is, a distance between the microphone 112(1) and the microphone 112(2) may be shorter than a distance between microphone 112(1) and the microphone 112(3) when the switch 122 is in up position. And, a distance between the microphone 112(1) and the microphone 112(3) may be shorter than a distance between microphone 112(1) and the microphone 112(2) when the switch 122 is in down position. Further, the microphone 112(1) and the microphone 112(2) may be in substantially the same horizontal plane (i.e., may have the same substantial vertical height from the floor) when the switch 122 is in the up position. Further, the microphone 112(1) and the microphone 112(3) may be in substantially the same horizontal plane (i.e., may have the same substantial vertical height from the floor) when the switch 122 is in the down position.

As described above, the voice-controlled light switch 108 may include operating logic to determine when the switch is in the up position and when the switch is in the down position. In some instances, in response to the local speech-recognition engine 132 identifying the predefined word or phrase, the microphone-selection engine may determine whether the switch 122 is in the up position or in the down position, and may select one or more audio signals to send to the remote service 116 based on this determination. For instance, in response to determining that the switch is the up position, the microphone-selection module 134 may send, to the remote service, audio signals generated by the first microphone 112(1) and by the second microphone 112(2). In another example, in response to determining that the switch is the up position, the microphone-selection module 134 may select, for processing, the audio signals generated by the first microphone 112(1) and by the second microphone 112(2). For instance, the light switch 108 may perform beamforming on these audio signals to generate one or more processed audio signals and may then send these one or more processed audio signals to the remote service 116. In some instances, when the switch is in the up position, the light switch 108 may use an audio signal generated by the third microphone 112(3) for identifying and background noise and, thereafter, removing at least some of the background noise from the audio signals generated by the first send second microphones.

Similarly, in response to determining that the switch is the down position, the microphone-selection module 134 may select, for processing, the audio signals generated by the first microphone 112(1) and by the third microphone 112(3). For instance, the light switch 108 may perform beamforming on these audio signals to generate one or more processed audio signals and may then send these one or more processed audio signals to the remote service 116. In some instances, when the switch is in the down position, the light switch 108 may use an audio signal generated by the second microphone 112(2) for identifying and background noise and, thereafter, removing at least some of the background noise from the audio signals generated by the first send third microphones.

As described above, and as shown via the illustration of the side of the light switch 108, because these microphones may be substantially vertically in-line with one another, these signals make good candidates for performing beamforming thereon to generate a processed audio signal having a relatively high SNR as compared to the signals by themselves. Further, in instances where the microphone-selection module 134 determines that the switch is the down position, the microphone-selection module 134 may send, to the remote service, audio signals generated by the first microphone 112(1) and by the third microphone 112(3).

Furthermore, and as illustrated, in some instances the voice-controlled light switch 108 may include a fourth microphone 112(4) that is substantially horizontally in-line with, but to the left of, the second microphone 112(2), as well as a fifth microphone 112(5) that is substantially horizontally in-line with, but to the right of, the second microphone 112(2). Similarly, the voice-controlled light switch 108 may include a sixth microphone 112(6) that is substantially horizontally in-line with, but to the left of, the third microphone 112(3), as well as a seventh microphone 112(7) that is substantially horizontally in-line with, but to the right of, the third microphone 112(3).

In these instances, in addition to determining whether the switch 122 is in the up or down position prior to selecting audio signals for processing, the microphone-selection module 134 may also take into account a location of the audio source, such as the speaking user, within the environment. To do so, the microphone-selection module may utilize TDOA techniques, images captured by a camera, or the like. For instance, given that each of the microphones 112(1)-(7) may detect a command sound at different times, the microphone-selection module 134 may compare these different times to estimate the direction of the user relative to the voice-controlled light switch 108. Once the direction of the user (or other audio source) has been estimated, the microphone-selection module 134 may determine which microphone on the faceplate 202 (or which combination of microphones) to send to the remote service 116. In one example, the microphone-selection engine defines a respective line between each microphone on the appropriate half of the faceplate 202 (e.g., each of the microphones on the top if the switch 122 is in the up position) and the first microphone 112(1) on the switch 122. The microphone-selection module 134 may then determine which line or lines most closely corresponds with the direction of the user. In some instances, the microphone-selection module 134 then selects this microphone pair and sends, to the remote service 116, the audio signals generated by this pair of microphones. To illustrate, if the user were standing relatively directly in front of the voice-controlled light switch 108 and the switch were in the up position, the microphone-selection module 134 may select the second microphone 112(2) along with the microphone 112(1). If, however, the user were to the right side of the voice-controlled light switch 108 when looking at the light switch 108, the voice-controlled module 134 may select the fourth microphone 112(4). If, however, the user were to the left of the voice-controlled light switch 108 when looking at the light switch 108, the microphone-selection module 134 may select the fifth microphone 112(5) along with the first microphone 112(1). In other instances, meanwhile, the microphone-selection engine may send more than two audio signals to the remote service 116 for increased accuracy. For instance, if the user were standing center-left relative to the voice-controlled light switch 108, the microphone-selection module 134 may send audio signals corresponding to the first microphone 112(1), the second microphone 112(2) and the fifth microphone 112(5). Further, it is noted that while FIG. 2 and subsequent figures illustrate example arrays of microphones, it is to be appreciated that other implementations may utilize more microphones, fewer microphones, and/or different configurations of microphones.

Figure 3:
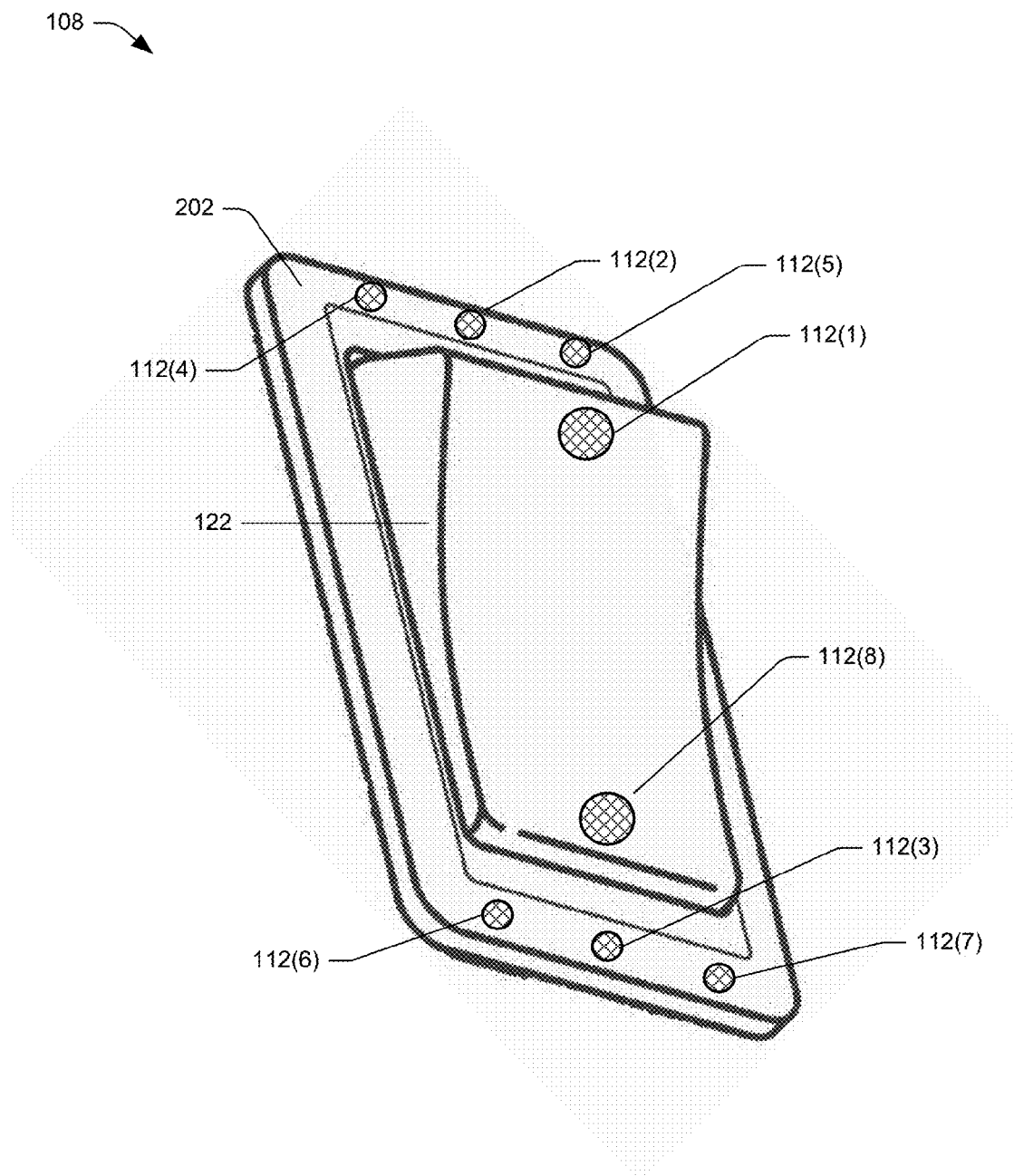
FIG. 3 illustrates another example configuration of a voice-controlled light switch. Here, the light switch is in the form of a rocker switch, and includes two microphones on the switch (or "rocker") and microphones on the top and bottom of the faceplate.

FIG. 3 illustrates another example configuration of the voice-controlled light switch 108. Here, the light switch 108 is in the form of a rocker switch, and includes two microphones on the switch 122 (or "rocker") and microphones on the top and bottom of the faceplate. That is, the switch 122 includes the first microphones 112(1) on the top portion of the rocker switch 122, as well as an eighth microphone 112(8) on the bottom portion of the switch 122. In addition, the top portion of the faceplate 202 of the voice-controlled light switch 108 again includes the three microphones 112(4), 112(2), and 112(5), while the bottom portion of the faceplate 202 includes the three microphones 112(6), 112(3), and 112(7).

As with the example of FIG. 2, the microphone-selection module 134 may determine whether the switch 122 is in the up or down position and may select, for processing, audio signals generated by microphones corresponding to the up or down position. In this case, for instance, if the switch 122 is in the up position, the microphone-selection module 134 may select, for processing, audio signals generated by the eight microphone 112(8), as well as one or more of the three microphones 112(6), 112(3), and 112(7). That is, given that when the rocker switch 122 is in the up position the first microphone 112(1) is nearly flush with the faceplate 202 while the eight microphone 112(8) juts further out away from the faceplate 202, and given that this separation between microphones allows for better beamforming, the microphone-selection engine may select the bottom microphones when the switch 122 is in the up position. Similarly, when the rocker switch 122 is determined to be in the down position, then the microphone-selection module 134 may select the microphones corresponding to the top of the light switch 108, namely the first microphone 112(1) along with one or more of the three microphones 112(4), 112(2), and 112(5).

Figure 4:
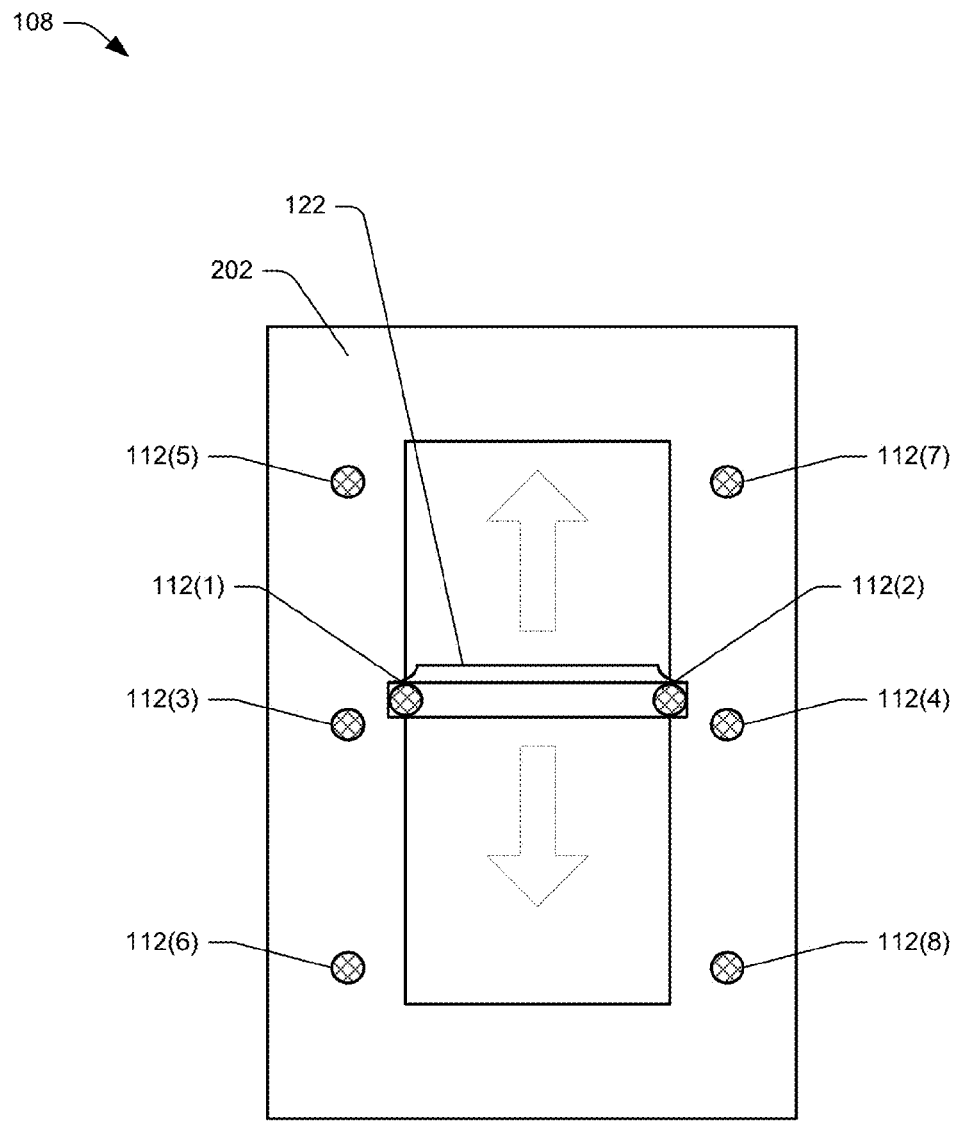
FIG. 4 illustrates yet another example configuration of a voice-controlled light switch. Here, the light switch is in the form of a sliding dimmer switch, and includes two microphones on the switch (or "sliding knob") that is configured to move to different positions of the dimmer switch, as well as microphones on the left and ride sides of the faceplate.

FIG. 4 illustrates yet another example configuration of the voice-controlled light switch 108 of FIG. 1. Here, the light switch is in the form of a sliding dimmer light switch that includes a sliding switch 122, which itself includes a first microphone 112(1) on the left side of the switch 122 and a second microphone 112(2) on the right side of the switch 122. In addition, the example light switch 108 includes three microphones on the left side of the faceplate plate 202 as well as three microphones on the right side of the faceplate 202. In some instances, the microphone-selection module 134 may select one or more pairs of microphones for use based on the location of the sliding switch 122, potentially along with the location of the user 104. For instance, if the sliding switch 122 is all the way to the top of its range, then the microphone-selection signal may select, for processing, audio signals corresponding to the microphone 112(5) and 112(1), or audio signals corresponding to the microphones 112(7) and 112(2). Similarly, if the sliding switch 122 is approximately halfway down its range, as illustrated, then the microphone selection module 134 may select, for processing, audio signals corresponding to the microphone 112(3) and 112(1), or audio signals corresponding to the microphones 112(4) and 112(2). In addition, if the sliding switch 122 is located all the way down its range, then the microphone selection module 134 may select, for processing, audio signals corresponding to the microphone 112(6) and 112(1), or audio signals corresponding to the microphones 112(8) and 112(2).

Figure 5:
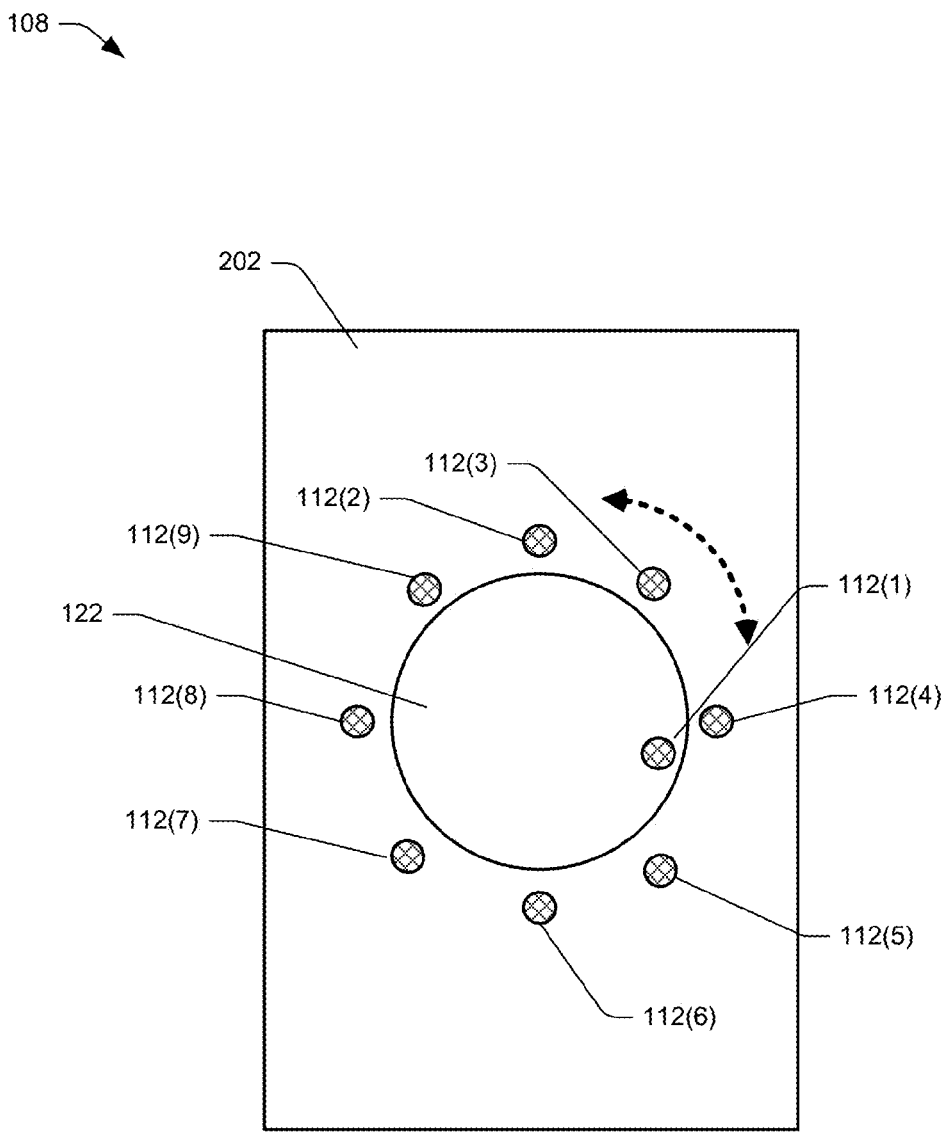
FIG. 5 illustrates yet another example configuration of a voice-controlled light switch. Here, the light switch is in the form of a rotatable-knob dimmer switch, and includes a microphone on the switch (or "rotatable knob") that is configured to move radially to different positions, as well as microphones distributed across the faceplate of the dimmer switch.

FIG. 5 illustrates yet another example configuration of the voice-controlled light switch 108 of FIG. 1. Here, the light switch 108 is in the form of a rotatable-knob dimmer switch, which comprises a rotatable switch 122 that a user is able to rotate radially to adjust an amount of power applied to a power load, similar to the dimmer light switch discussed above with reference to FIG. 4. In this example, the rotatable switch 122 may comprise the first microphone 112(1). In addition, the faceplate 202 of the light switch 108 may include one or more microphones, potentially equally distributed radially about the rotatable switch 122. For instance, in this example the light switch 108 includes microphones 112(2), 112(3), . . . , 112(9). When the voice-controlled light switch 108 receives an instruction to process one or more audio signals, the microphone-selection module 134 may select audio signals corresponding to one or more pairs of microphones. For instance, the microphone-selection module 134 may determine which of the microphones 112(2)-(9) is closest to the current location of the microphone 112(1) and may send, to the remote service 116, the audio signal corresponding to this microphone and to the first microphone 112(1). For instance, as illustrated the microphone-selection module 134 may select the audio signal corresponding to the microphone 112(4) and may therefore send, to the remote service 116, the audio signals corresponding to the first microphone 112(1) and the fourth microphone 112(4). Further, while FIG. 5 illustrates the first microphone 112(1) along with the additional microphones on the faceplate, in other instances the rotatable knob 122 may include the first microphone on a face of the knob and a second microphone located nearer the face plate and vertically in-line with the first microphone. As such, no matter the position of the knob, the audio signals generated by these microphones may be used to increase the SNR of the signals using beamforming or other processing techniques.

In addition, while FIG. describes a light switch that couples a power source to a power load, in some instances an apparatus may have the same form factor as the apparatus of FIG. 5, while not coupling to a power source. This apparatus may instead simply comprise a rotatable know or other type switch that includes the first microphone 112(1) and one or more additional microphones, on a faceplate and/or on a second position on the knob closer to the faceplate. While this apparatus might not couple to a power source, this apparatus may include the same functionality for determining a position of the knob and selecting one or more audio signals for processing based on this position.

Figure 6:
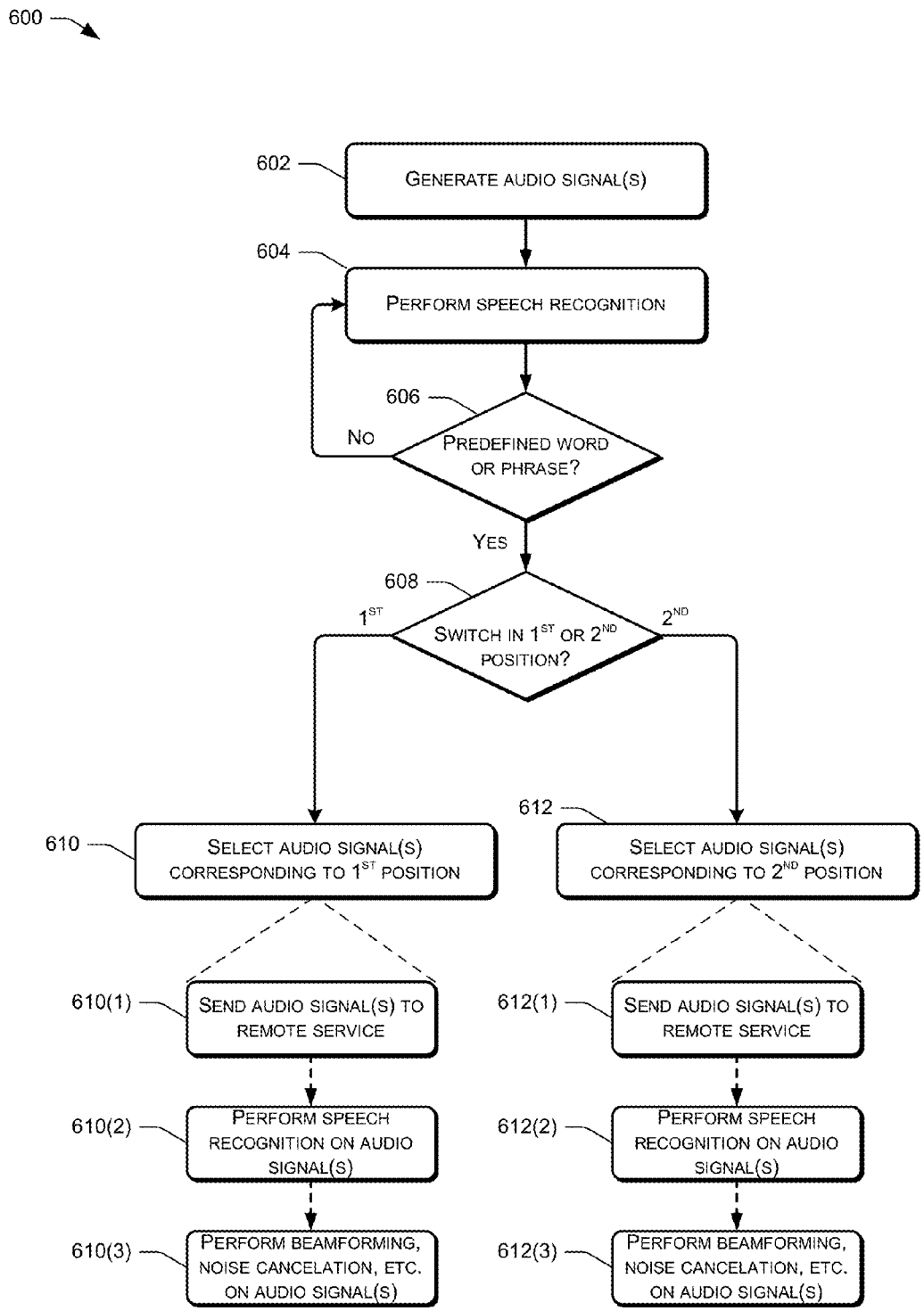
FIG. 6 illustrates a flow diagram of an example process for selecting which audio signals to process based on a position of a switch in a voice-controlled light switch. Processing the signals may include sending these signals to a remote service for further processing, such as performing beamforming on the signals to generate a processed audio signal and performing speech recognition on the processed audio signal. Additionally or alternatively, processing these signals may include performing beamforming, noise-cancelation, or the like locally at the switch or at another device in the environment, and/or performing speech recognition locally at the switch or at another device in the environment.

FIG. 6 illustrates a flow diagram of an example process 600 for selecting which audio signals to process based on a position of a switch in a voice-controlled light switch. Processing the signals may include sending these signals to a remote service for further processing, such as performing beamforming on the signals to generate a processed audio signal and performing speech recognition on the processed audio signal. Additionally or alternatively, processing these signals may include performing beamforming, noise-cancelation, or the like locally at the switch or at another device in the environment, and/or performing speech recognition locally at the switch or at another device in the environment.

The process 600 (and each process described herein) is illustrated as a logical flow graph, each operation of which represents a sequence of operations that can be implemented in hardware, software, or a combination thereof. In some instances, some or all of the operations are executed by the components of a voice-controlled light switch, such as the light switch 108 described above. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 602, the process 600 generates one or more audio signals. For instance, if a voice-controlled light switch comprises multiple microphones, one or more of these microphones may generate a corresponding audio signal based on sound detected within an environment of the light switch. At 604, the process 600 performs speech recognition on one or more of these generated audio signals. For instance, a speech-recognition module 134 operating on the light switch may perform speech recognition on one or more of the signals to identify a predefined word or phrase. At 606, the process 600 queries whether it has identified the predefined word or phrase based on the performing of the speech recognition. If not, then the process 600 returns to the operation 604 to continue monitoring the audio signals for the predefined word or phrase.

If the process 600 identifies the predefined word or phrase, however, then the process 600 determines, at 608, whether the switch is in a first position or a second position. While the example process 600 describes determine whether the switch is in one of two positions, in other implementations any other number of positions may be utilized. In any event, if it is determined that the switch is in the first position, then at 610 the process 610(1) selects, for processing, audio signals corresponding to the first position for processing. As described above, these signals may also be selected based on other criteria, such as a location of the user within the environment of the light switch. Furthermore, and as illustrated, "processing" these audio signals may include, but is not limited to, sending the audio signals to a remote service for further processing, such as performing beamforming and speech recognition thereon (operation 610(1)), performing speech recognition locally at the light switch (operation 610(2)), and/or performing beamforming, noise cancellation, acoustic echo cancelation or the like on the audio signals locally at the light switch (operation 610(3)). Similarly, if the process 600 determines that the switch is in the second position, then at 612 the process 600 may select, for processing, audio signals corresponding to the second position. Again, processing of these signals may include sending the signals to a remote service (operation 612(1)), performing speech recognition on the signals locally (operation 612(2)), and/or performing beamforming or the like on the signals locally (operation 612(3)).

Figure 7:
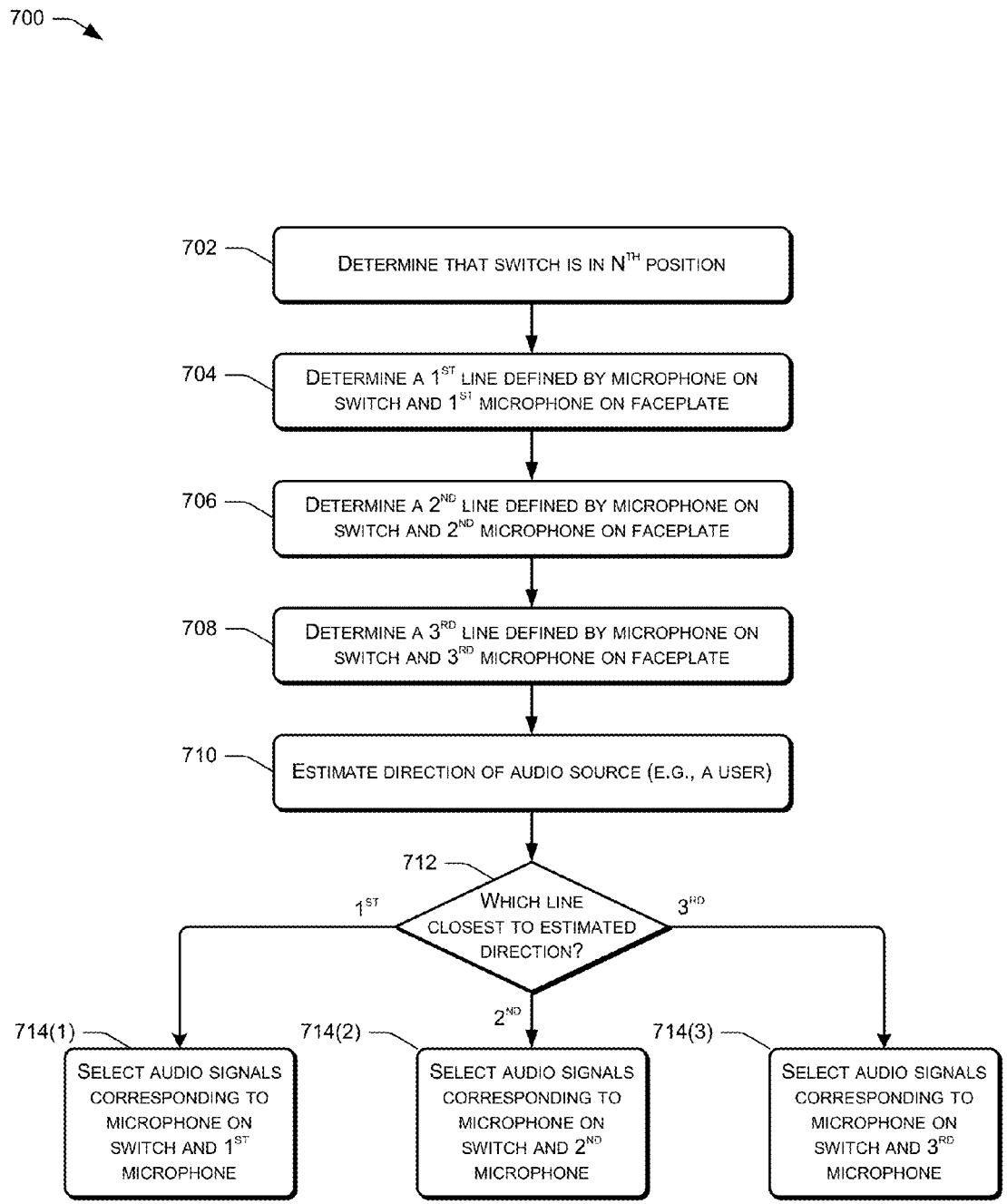
FIG. 7 illustrates a flow diagram of an example process for selecting audio signals for processing based on a position of a switch, as well as based on a position of an audio source (e.g., a speaking user) within the environment.

FIG. 7 illustrates a flow diagram of an example process 700 for selecting audio signals for processing based on a position of a switch, as well as based on a position of an audio source (e.g., a speaking user) within the environment. At 702, the process 700 determines that the switch is in the n$^{th}$ position (representative of any available position). At 704, the process 700 determines a first line defined by a microphone on a switch of a light switch and a first microphone on a faceplate that corresponds to the n$^{th}$ position. At 706, the process 700 determines a second line defined by the microphone on the switch and a second microphone on a faceplate that corresponds to the n$^{th}$ position. At 708, the process 700 determines a third line defined by the microphone on the switch and a third microphone on a faceplate that corresponds to the n$^{th}$ position. At 710, the process 700 estimates a direction of an audio source (e.g., a speaking user) within the environment using TDOA techniques, a camera or the like. Then, at 712, the process 700 queries whether the first, second, or third line is closest to the estimated direction of the audio source. If the process 700 determines that the first line is closest, then at 714(1) the process 700 selects, for processing, audio signals corresponding to the microphone on the switch and the first microphone on the faceplate. If, however, the process 700 determines that the second line is closest, then at 714(2) the process 700 selects, for processing, audio signals corresponding to the microphone on the switch and the second microphone on the faceplate. Finally, if the process 700 determines that the third line is closest, then at 714(3) the process 700 selects, for processing, audio signals corresponding to the microphone on the switch and the third microphone on the faceplate. Further, while three example faceplate microphones are described, it is to be appreciated that other implementations may utilize any other number of microphones on the faceplate.

Figure 8:
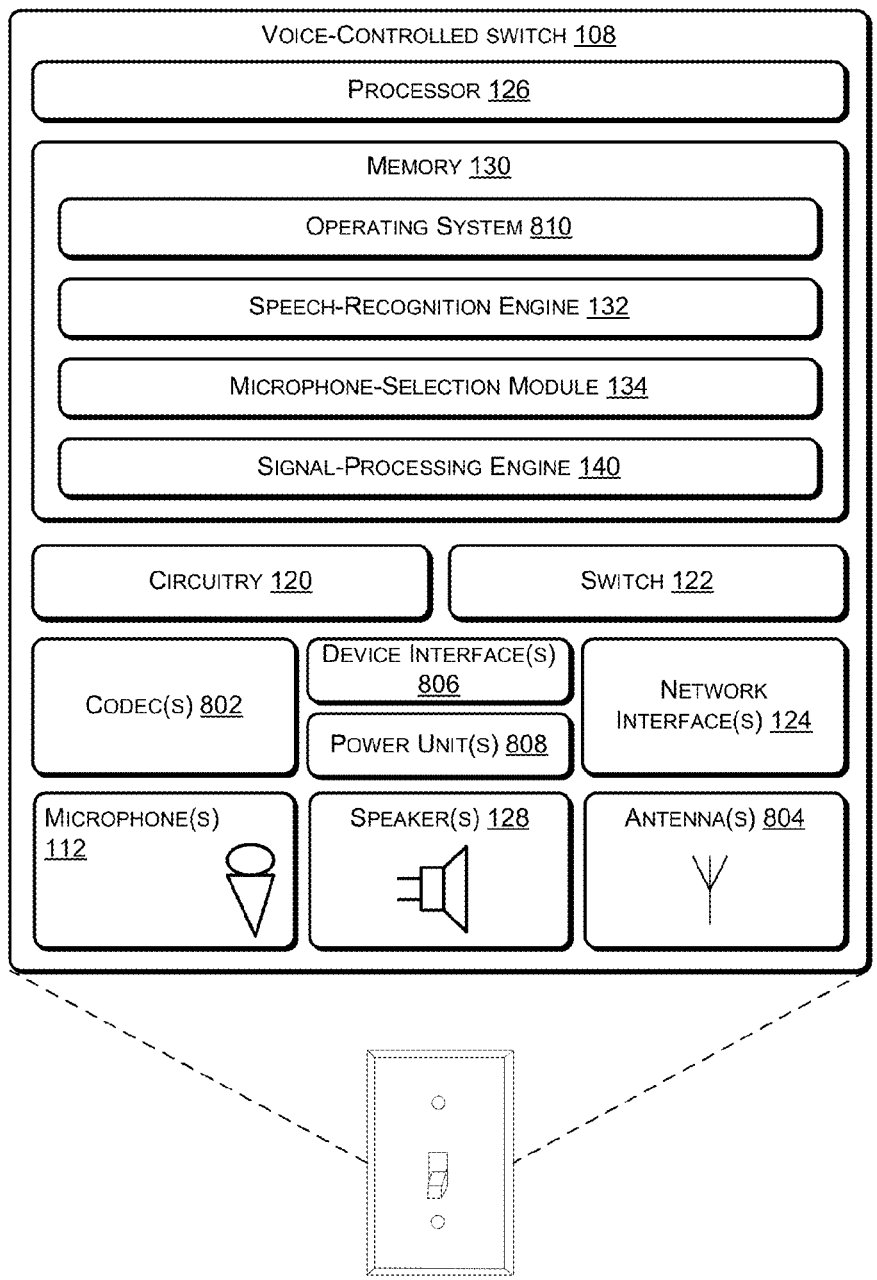
FIG. 8 shows a block diagram of selected functional components implemented in the voice-controlled light switch of FIG. 1.

FIG. 8 shows a block diagram of selected functional components implemented in the voice-controlled light switch 108 of FIG. 1. While this figure illustrates one example light switch 108, it is to be appreciated that any other type of client or server computing device may implement the techniques described herein. Furthermore, it is to be appreciated that the light switch 108 may include some or all of the components described above with reference to the remote service 116.

In the illustrated implementation, the voice-controlled light switch 108 includes the processor 126 and memory 130. The memory 130 may include computer-readable storage media ("CRSM"), which may be any available physical media accessible by the processor 126 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 126.

The voice-controlled light switch 108 includes the microphone(s) 112 that to receive audio input, such as user voice input. The light switch 108 may also include the speaker(s) 128 to output audio sounds. One or more codecs 802 are coupled to the microphones and the speakers to encode and/or decode the audio signals. The codec may convert audio data between analog and digital formats. A user may interact with the light switch 108 by speaking to it and the microphones 112 capture sound and generate audio signals that includes the user speech. The codec 802 encodes the user speech and transfers that audio data to other components.

In the illustrated example, the voice-controlled light switch 108 includes the one or more network interfaces 124, which may couple to one or more antennas 804 to facilitate a wireless connection to a network. The network interfaces 124 may implement one or more of various wireless technologies, such as WiFi, Bluetooth, RF, and so on.

One or more device interfaces 806 (e.g., USB, broadband connection, etc.) may further be provided as part of the light switch 108 to facilitate a wired connection to a network, or a plug-in network device that communicates with other wireless networks. One or more power units 808 may be further provided to distribute power to the various components on the light switch 108. In some instances, meanwhile, the light switch couples to a persistent power source, such as a primary AC power supply.

Several modules such as instruction, datastores, and so forth may be stored within the memory 130 and configured to execute on the processor 126. An operating system module 810 is configured to manage hardware and services (e.g., wireless unit, Codec, etc.) within and coupled to the light switch 108 for the benefit of other modules. In addition, the memory 130 may include the speech-recognition engine 132, the microphone-selection module 134, and/or the signal-processing engine 140 described above, amongst other modules. Some or all of these modules, data stores, and components may reside additionally or alternatively at the remote service 116.

Furthermore, the light switch 108 may include the circuitry 120 for coupling the light switch to a power source and to a power load, such as a light, electrical outlet, or the like. At a minimum, the circuitry may include one or more wires for making this connection to the persistent power source. Finally, the light switch may include the physical switch 122 that is selectable to provide power to the power load and to cease providing power to the power load. In some instances, and as discussed above, the switch 122 may be adjustable to provide varying levels of power to the connected power load(s), while in other instances the switch 122 may include two positions, on and off. Further, the circuitry 120 may also include an internal switch that causes the one or more wires to couple together to cause the power source to provide power to the coupled power load. In some instances, this internal switch of the circuitry 120 may couple the wires in this manner in response to a user flipping the physical switch 122 or in response to execution of an instruction received based on a user issuing a voice command.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus comprising:
   one or more wires to couple to a power source and to at least one light;
   a switch configured to toggle between at least an on position and an off position, the one or more wires providing power from the power source to the at least one light when the switch is in the on position and not providing power from the power source to the at least one light when the switch is in the off position;
   a faceplate;
   a first microphone located on a distal end of the switch;

a second microphone located at a first position of the faceplate, the first position being near the distal end of the switch when the switch is in the on position;
a third microphone located at a second position of the faceplate, the second position being near the distal end of the switch when the switch is in the off position;
a wireless network interface;
one or more processors;
one or more computer-readable media storing computer-executable instructions that, when executed, cause the one or more processors to perform acts comprising:
receiving a first audio signal generated by at least one of the first microphone, the second microphone, or the third microphone;
performing speech recognition on the first audio signal;
determining that the first audio signal includes data representing at least one predefined word;
determining that the switch is in the off position;
performing beamforming on a second audio signal generated by the first microphone and on a third audio signal generated by the third microphone to generate one or more processed audio signals; and
sending, to a remote device and via the wireless network interface, the one or more processed audio signals.

2. The apparatus as recited in claim 1, the acts further comprising:
receiving, from the remote device, an instruction to turn on the at least one light; and
coupling the one or more wires to cause the one or more wires to provide power from the power source to the at least one light while the switch remains in the off position.

3. The apparatus as recited in claim 1, wherein the first position is located approximately at a middle of a horizontal dimension of the faceplate and the second position is located approximately at the middle of the horizontal dimension of the faceplate, and further comprising:
a fourth microphone located substantially horizontally in-line with the second microphone and towards a left side of the faceplate;
a fifth microphone located substantially horizontally in-line with the second microphone and towards a right side of the faceplate;
a sixth microphone located substantially horizontally in-line with the third microphone and towards the left side of the faceplate; and
a seventh microphone located substantially horizontally in-line with the third microphone and towards the right side of the faceplate.

4. The apparatus as recited in claim 3, the acts further comprising determining, prior to the sending, that a first line defined by the third microphone and the first microphone is more in-line with a user that stated the at least one predefined word than a second line defined by the sixth microphone and the first microphone and a third line defined by the seventh microphone and the first microphone.

5. An apparatus comprising:
one or more wires to couple to an alternating-current (AC) power source located within a building and to at least one power load;
a switch configured to move from at least a first position to a second position, when the switch is in the first position the AC power source is electrically coupled to the at least one power load and when the switch is in the second position the AC power source is decoupled from the at least one power load;
a faceplate;
a first microphone located proximate the faceplate configured to generate a first audio signal;
a second microphone located proximate the faceplate configured to generate a second audio signal;
one or more processors; and
one or more computer-readable media storing computer-executable instructions that, when executed, cause the one or more processors to perform acts comprising:
performing beamforming on the first audio signal and the second audio signal to generate one or more processed audio signals; and
sending the one or more processed audio signals to a remote device configured to perform speech recognition on the one or more processed audio signals.

6. The apparatus as recited in claim 5, further comprising:
a wireless network interface;
and wherein the sending comprises sending the one or more processed audio signals using the wireless network interface.

7. The apparatus as recited in claim 5,
wherein the acts further comprise performing speech recognition on at least one of the first audio signal, the second audio signal, or the one or more processed audio signals to at least one of identity data representing a predefined utterance or identify data representing a voice command related to the at least one power load or another power load.

8. The apparatus as recited in claim 5, further comprising:
a third microphone located on the switch configured to generate a third audio signal;
and wherein the acts further comprise:
performing speech recognition on at least one of the first audio signal, the second audio signal, or the one or more processed audio signals; and
identifying data representing a predefined utterance;
and wherein the sending comprises sending the one or more processed audio signals to the remote device at least partly in response to the identifying.

9. The apparatus as recited in claim 5, wherein the first microphone is located at a third position proximate the faceplate that is nearer the switch when the switch is in the first position and the second microphone is located at a fourth position proximate the faceplate that is nearer the switch when the switch is in the second position, and further comprising:
a third microphone located on the switch configured to generate a third audio signal;
and wherein the acts further comprise:
determining that the switch is in the first position;
selecting the first audio signal generated by the first microphone for at least one of processing or sending at least partly in response to determining that the switch is in the first position;
determining that the switch is in the second position; and
selecting the second audio signal generated by the second microphone for at least one of processing or sending at least partly in response to determining that the switch is in the second position.

10. The apparatus as recited in claim 5, wherein the first microphone and the second microphone are located substantially horizontally in-line with one another proximate the faceplate.

11. The apparatus as recited in claim 5, further comprising a button that is selectable to cause at least one of the first microphone to generate the first audio signal or the second microphone to generate the second audio signal.

12. The apparatus as recited in claim 5, wherein the switch comprises a toggle switch, a rocker switch, a dimmer switch, or a time-delay switch.

13. The apparatus as recited in claim 5, wherein the at least one power load comprises a light, an electrical outlet, or a home appliance.

14. A method comprising:
receiving a first audio signal generated by a first microphone residing on a physical switch;
receiving a second audio signal generated by a second microphone;
receiving a third audio signal generated by a third microphone;
determining that the physical switch resides in a first position; and
at least partly based on the physical switch residing in the first position, selecting at least the first audio signal and the second audio signal for processing.

15. The method as recited in claim 13, wherein the selecting the first audio signal and the second audio signal for processing comprises sending the first audio signal and the second audio signal to a remote device without sending the third audio signal to the remote device.

16. The method as recited in claim 13, wherein the selecting the first audio signal and the second audio signal for processing comprises performing beamforming on the first audio signal and the second audio signal to generate one or more processed audio signals, and further comprising at least one of sending the one or more processed audio signals to a remote device or performing speech recognition on the one or more processed audio signals.

17. The method as recited in claim 13, further comprising:
performing speech recognition on at least one of the first audio signal, the second audio signal, or the third audio signal; and
determining that the at least one of the first audio signal, the second audio signal, or the third audio signal includes data representing a predefined utterance;
and wherein the selecting the first audio signal and the second audio signal for processing is further based at least in part on the determining that the at least one of the first audio signal, the second audio signal, or the third audio signal includes the data representing the predefined utterance.

18. The method as recited in claim 13, further comprising:
determining that the physical switch resides in a second position; and
at least partly in response to determining that the physical switch resides in the second position, selecting at least the first audio signal and the third audio signal for processing.

19. The method as recited in claim 13, further comprising:
receiving a fourth audio signal generated by a fourth microphone, the fourth microphone residing substantially horizontally in-line with the second microphone;
determining that a first line defined by the second microphone and the first microphone points closer to a source of audio than does a second line defined by the fourth microphone and the first microphone;
and wherein the selecting the first audio signal and the second audio signal for processing is further based at least in part on the determining that the first line points closer to the source of audio than does the second line.

20. The method as recited in claim 13, wherein:
the receiving the first audio signal comprises receiving the first audio signal generated by the first microphone residing on a physical switch of a light switch;
the receiving the second audio signal comprises receiving the second audio signal generated by the second microphone residing on a top portion of a faceplate of the light switch; and
the receiving the third audio signal comprises receiving the third audio signal generated by the third microphone residing on a bottom portion of the faceplate of the light switch.

\* \* \* \* \*